US007221871B2

(12) United States Patent
Richards et al.

(10) Patent No.: US 7,221,871 B2

(45) **Date of Patent: *May 22, 2007**

(54) IDENTIFICATION OF POLARIZATION-MODE DISPERSION ON A COMMUNICATION NETWORK

(75) Inventors: Douglas Lew Richards, Stilwell, KS (US); Christopher Thomas Allen, Lawrence, KS (US); Douglas Charles Hague, Overland Park, KS (US); Mark Loyd Jones, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 691 days.

This patent is subject to a terminal disclaimer.

(21) Appl. No.: 10/621,858

(22) Filed: Jul. 17, 2003

(65) Prior Publication Data

US 2005/0025482 A1 Feb. 3, 2005

(51) Int. Cl.
*H04J 14/02* (2006.01)

(52) U.S. Cl. ......................... 398/81; 398/147; 398/152

(58) Field of Classification Search ............ 398/29–33, 398/81, 119, 136, 152, 158–159, 147
See application file for complete search history.

(56) References Cited

U.S. PATENT DOCUMENTS 6,396,606 B1 5/2002 Mao
6,437,892 B1 8/2002 Fang et al.
6,781,679 B1 * 8/2004 Richards et al. ........... 356/73.1
2002/0039217 A1 * 4/2002 Saunders et al. ........... 359/161
2002/0138796 A1 * 9/2002 Jacob ......................... 714/712

FOREIGN PATENT DOCUMENTS

WO WO 01/065733 A1 9/2001
WO WO 2003/055107 A3 7/2003

OTHER PUBLICATIONS

Kaminow, Ivan P., "Optical Fiber Telecommunications IIIA," Academic Press, 1997, pp. 145-151.
Derickson, Dennis, "Fiber Optic Test and Measurement," Hewlett-Packard Professional Books, Prentice Hall PTR, 1998.
Agilent Technologies, "Narrowband PMD Measurements with the Agilent 8509C, Product Note 8509-2," 1999.

(Continued)

*Primary Examiner*—Dzung Tran

(57) ABSTRACT

A monitoring system is described that is comprised of a processing system and a database system. The database system is configured to store identities for a plurality of channels in the communication network. The processing system identifies an error on a first channel of the plurality of channels. The processing system identifies a second channel of the plurality of channels that is adjacent to the first channel based on the database system and determines if an error occurs on the second channel. The processing system identifies a third channel of the plurality of channels based on database system and determines if an error occurs on the third channel. The processing system identifies polarization-mode dispersion based on determining the error occurs on the second channel and determining the error does not occur on the third channel.

20 Claims, 6 Drawing Sheets

200

START

IDENTIFY AN ERROR ON A FIRST CHANNEL — 202

IDENTIFY A SECOND CHANNEL ADJACENT TO THE FIRST CHANNEL — 204

DETERMINE IF AN ERROR OCCURS ON THE SECOND CHANNEL — 206

IDENTIFY A THIRD CHANNEL — 208

DETERMINE IF AN ERROR OCCURS ON THE THIRD CHANNEL — 210

IDENTIFY PMD IF THERE IS AN ERROR ON THE SECOND CHANNEL AND IS NOT AN ERROR ON THE THIRD CHANNEL — 212

END

OTHER PUBLICATIONS

Namihira, Y., "Comparison of Various Polarisation Mode Dispersion Measurement Methods in Optical Fibres," Electronic Letters 3rd Dec. 1992, vol. 28, No. 25, pp. 2265-2266.

Allen, Christoper, "Measured temporal and spectral PMD characteristics and their implications for network-level mitigation approaches," Journal of Lightwave Technology, Apr. 11, 2002.

Allen, Christopher, "Analysis and comparison of measure DGD data on buried single-mode fibers," Symposium on Optical Fiber Measurements, Jun. 7, 2002.

Karlsson, Magnus, "Autocorrelation function of the polarization-mode dispersion vector," Optical Society of America Optics Letters, Jul. 15, 1999, vol. 24, No. 14, pp. 939-941.

* cited by examiner 300
301
302
303
304
OLA
321
322
323
324
325
OADM
311
312
331
332
333
334
335
PROCESSING SYSTEM 352
DATABASE 354
MONITORING SYSTEM 350

| | **Outage Probability** | **Mean Outage Rate** | **Mean Outage Duration** |
|---|---|---|---|
| M | Pout | Rout | Tout |
| Threshold/<DGD> | (min/year) | (events/year) | (min/event) |
| 1.0 | 243046 | 461 | 527.0 |
| 1.1 | 197138 | 427 | 461.6 |
| 1.2 | 155591 | 379 | 410.3 |
| 1.3 | 119480 | 324 | 369.1 |
| 1.4 | 89268 | 266 | 335.3 |
| 1.5 | 64893 | 211 | 307.2 |
| 1.6 | 45901 | 162 | 283.4 |
| 1.7 | 31594 | 120 | 263.0 |
| 1.8 | 21162 | 86.2 | 245.4 |
| 1.9 | 13796 | 60.0 | 229.9 |
| 2.0 | 8754 | 40.5 | 216.4 |
| 2.1 | 5407 | 26.5 | 204.3 |
| 2.2 | 3251 | 16.8 | 193.5 |
| 2.3 | 1903 | 10.4 | 183.8 |
| 2.4 | 1084 | 6.20 | 175.0 |
| 2.5 | 602 | 3.60 | 167.0 |
| 2.6 | 325 | 2.04 | 159.7 |
| 2.7 | 171 | 1.12 | 153.1 |
| 2.8 | 87.7 | 0.597 | 146.9 |
| 2.9 | 43.8 | 0.310 | 141.2 |
| 3.0 | 21.3 | 0.156 | 136.0 |
| 3.1 | 10.1 | 0.0768 | 131.1 |
| 3.2 | 4.65 | 0.0367 | 126.5 |
| 3.3 | 2.09 | 0.0171 | 122.3 |
| 3.4 | 0.913 | 0.00772 | 118.3 |
| 3.5 | 0.389 | 0.00340 | 114.6 |
| 3.6 | 0.162 | 0.00146 | 111.1 |
| 3.7 | 0.0654 | 6.07E-04 | 107.8 |
| 3.8 | 0.0258 | 2.46E-04 | 104.6 |
| 3.9 | 0.00990 | 9.74E-05 | 101.7 |
| 4.0 | 0.00370 | 3.75E-05 | 98.9 |
| 4.1 | 0.00135 | 1.40E-05 | 96.3 |
| 4.2 | 4.80E-04 | 5.12E-06 | 93.7 |
| 4.3 | 1.66E-04 | 1.82E-06 | 91.4 |
| 4.4 | 5.60E-05 | 6.29E-07 | 89.1 |
| 4.5 | 1.84E-05 | 2.12E-07 | 86.9 |
| 4.6 | 5.89E-06 | 6.94E-08 | 84.9 |
| 4.7 | 1.84E-06 | 2.22E-08 | 82.9 |
| 4.8 | 5.59E-07 | 6.90E-09 | 81.0 |
| 4.9 | 1.66E-07 | 2.09E-09 | 79.3 |
| 5.0 | 4.82E-08 | 6.18E-10 | 78.0 |

FIG. 6

IDENTIFICATION OF POLARIZATION-MODE DISPERSION ON A COMMUNICATION NETWORK

BACKGROUND OF THE INVENTION

1. Field of the Invention

The invention is related to the field of communications, and in particular, to systems and methods for identification of polarization-mode dispersion on a communication network.

2. Description of the Prior Art

Polarization-Mode Dispersion (PMD) is a dynamic pulse broadening phenomena. In a single-mode optical fiber, optical pulses propagating down the fiber will separate into two orthogonal modes of polarization that travel at different speeds. The relative amplitudes of these two pulses are determined by the state of polarization of the input pulse relative to the fiber's input principal states of polarization (PSP). The separation into the two orthogonal modes is caused by the non-uniformity of the core diameter of the fiber. This non-uniformity of the core diameter may be a result of imperfections in manufacturing, ambient temperatures, stress on the fiber, and/or movement of the fiber.

If the core has a perfectly circular cross-section, then both modes travel at the same speed over the same distance. Otherwise, one mode travels slower than the other mode resulting in a difference in group velocities (an effect called birefringence). Like chromatic dispersion, the difference in velocities between polarization modes is wavelength dependent. For PMD, the difference in velocity is also time dependent. The difference in propagation time, $\Delta\tau$, experienced by the two polarization modes at a given wavelength is referred to as the differential group delay (DGD) with units in picoseconds (ps). It is well known that $\Delta\tau$ obeys a Maxwellian distribution. When the DGD in a fiber becomes excessively large, the receiver is unable to distinguish between a zero bit and a one bit, and bit errors occur eventually resulting in a PMD-induced outage.

PMD is a time varying stochastic effect. Identification, measurement, and compensation for PMD are difficult because of the time varying stochastic nature of PMD. A fiber operator may have an outage on a fiber that is unknowingly caused by PMD. Due to the time varying stochastic nature of PMD, the outage may resolve itself Thus, the fiber operator may have trouble tickets that are closed or left unresolved even after extensive activity by maintenance employees. PMD has traditionally been identified through direct measurement of PMD or other analog characteristics of the optical signal. Some prior systems have identified, measured, and compensated for PMD by measurement of DGD, PSP, or other control variables. One such system is disclosed in a pending U.S. patent application Ser. No. 09/500,092, entitled "Method And Apparatus To Compensate For Polarization Mode Dispersion," filed on Feb. 8, 2000, which is incorporated herein by reference. Other prior systems monitor eye openings of the optical signal or perform other analog measurements of the optical signal to identify PMD. Another prior system measures the PMD, measures a bit error rate (BER), and correlates the PMD and BER to isolate errors due to the PMD. This system is disclosed in a pending United States Patent Application, entitled "Correlating Polarization Mode Dispersion and Bit Error Rate," filed on Apr. 25, 2000 and having Ser. No. 09/558,448. One problem with these prior systems is the cost of identifying, measuring, and compensating for PMD can be expensive. What is needed is a system to monitor a communication system and identify PMD that is accurate and cost effective.

SUMMARY OF THE INVENTION

Some examples of the invention help solve the above problems with a monitoring system that monitors a communication network to identify polarization-mode dispersion. The monitoring system comprises a processing system and a database system. The database system is configured to store identities for a plurality of channels in the communication network. The processing system identifies an error on a first channel of the plurality of channels. The processing system identifies a second channel of the plurality of channels that is adjacent to the first channel based on the database system. The processing system determines if an error occurs on the second channel that is adjacent to the first channel. The processing system identifies a third channel of the plurality of channels based on database system. The processing system determines if an error occurs on the third channel. The processing system identifies polarization-mode dispersion based on determining an error occurs on the second channel that is adjacent to the first channel and determining an error does not occur on the third channel.

The invention may include other examples described below.

BRIEF DESCRIPTION OF THE DRAWINGS

The same reference number represents the same element on all drawings.

FIG. 6 is a table of polarization-mode dispersion statistics in an example of the invention.

DETAILED DESCRIPTION OF THE INVENTION

FIGS. 1–6 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

EXAMPLE #1

FIGS. 1–2

Figure 1:
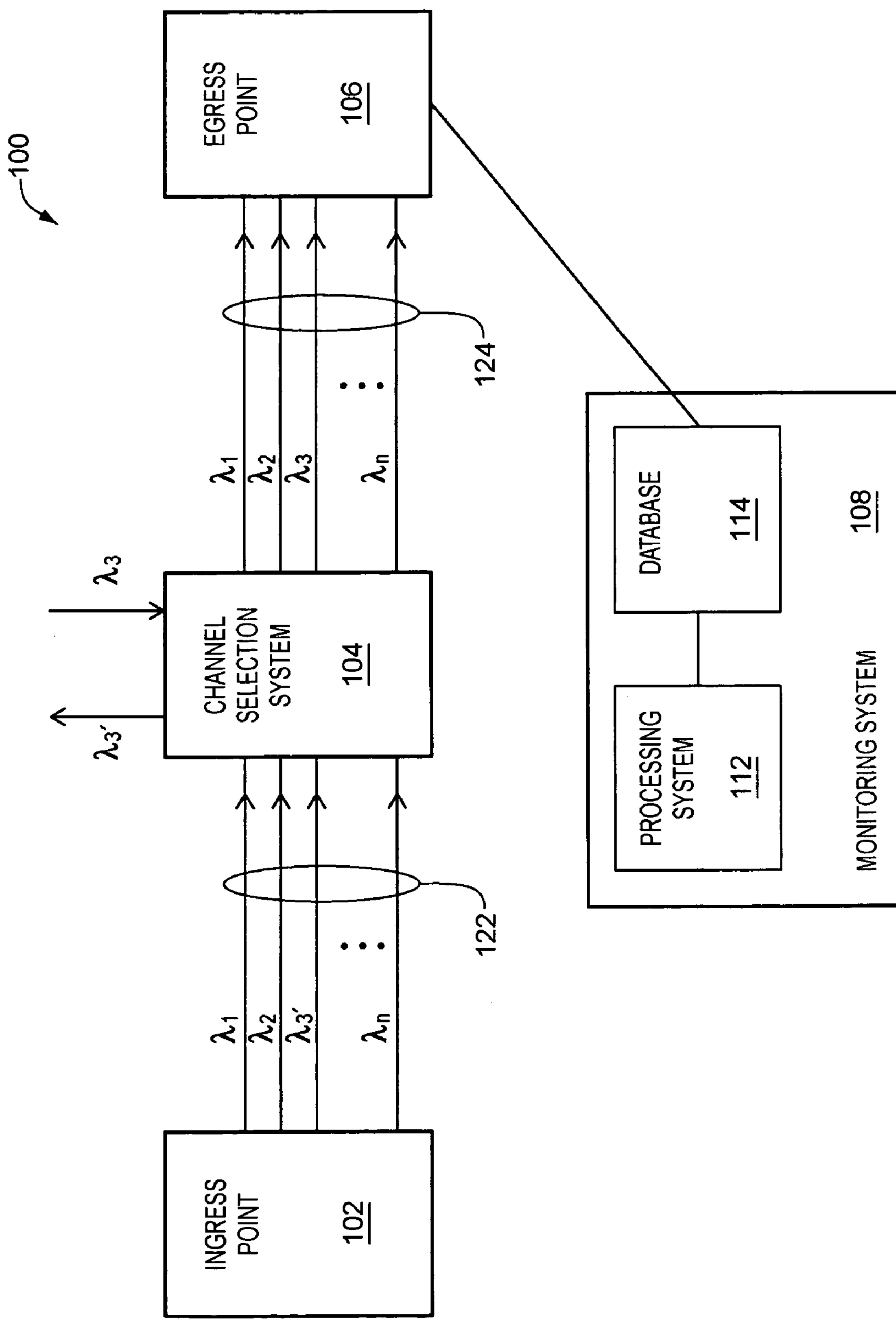
FIG. 1 illustrates a communication network in an example of the invention.

FIG. 1 illustrates a communication network 100 in an example of the invention. Communication network 100 is comprised of an ingress point 102, a channel selection system 104, an egress point 106, and a monitoring system 108. Monitoring system 108 is comprised of a processing system 112 and a database 114. Ingress point 102 is coupled to channel selection system 104 by one or more optical links 122. Channel selection system 104 is coupled to egress point 106 by one or more optical links 124. Monitoring system 108 is configured to communicate with egress point 106.

The following definitions may help to better understand the invention. An error comprises any condition that indicates one or more errors on an optical signal, a problem or problems on an optical signal, or degradation of an optical signal. Some examples of an error are parity errors, high bit error counts, or optical signal degradation. A channel comprises a wavelength of an optical signal used to carry information from an ingress point to an egress point along an optical path. An ingress point comprises any system or device where a channel is converted from electrical format to optical format and transmitted on the communication network. An egress point comprises any system or device where a channel is received from the communication network and is converted from optical format to electrical format. A channel selection system comprises any system or device configured to pass channels, add channels, and/or drop channels. One example of a channel selection system is an Optical Add/Drop Multiplexer (OADM). A band comprises a set of multiple channels that share an optical path between ingress and egress points and are treated as a single entity by a channel selection system. An optical link comprises an optical path were all channels share a path within a medium. One example of an optical link is an optical fiber between an ingress point and a channel selection system. An optical path comprises one or more optical links.

A second channel being "adjacent" to a first channel refers to the second channel being proximate to the first channel in a wavelength spectrum. The second channel and the first channel are both within at least one optical link. The second channel may be sufficiently proximate to the first channel so that polarization-mode dispersion on the first channel would be correlated to the second channel. In one embodiment, the second channel is adjacent to the first channel if the second channel is within the differential group delay (DGD) bandwidth of the first channel. The DGD bandwidth is inversely proportional to the mean DGD as shown in the following equation:

$$\omega_c = \frac{4\sqrt{2}}{<\Delta\tau>}$$

The second channel may include a wavelength that is shorter than a wavelength of the first channel. The second channel may include a wavelength that is longer than a wavelength of the first channel. The first channel is correlated to every proximate channel, but the strength of the correlation depends on how far apart the channels are.

A third channel and the first channel are both within at least one optical link. The third channel may be sufficiently separated from the first channel so that polarization-mode dispersion on the first channel would not be correlated to the third channel. In one embodiment, the third channel is not adjacent to the first channel. The third channel is not adjacent if the third channel is more than the DGD bandwidth away from the first channel.

The operation of communication network 100 is as follows. Ingress point 102 transmits a plurality of channels ($\lambda_1$, $\lambda_2$, $\lambda_{3'}$, . . . , $\lambda_n$) over optical link 122 to channel selection system 104. Channel selection system 104 may drop a channel ($\lambda_{3'}$) received over optical link 122. Channel selection system 104 may add a channel ($\lambda_3$) to optical link 124. Channel selection system 104 then passes a plurality of channels ($\lambda_1$, $\lambda_2$, $\lambda_3$, . . . , $\lambda_n$) over optical link 124 to egress point 106.

Communication network 100 may be comprised of many more egress points, ingress points, channel selection systems, and optical links. Communication network 100 may also include other devices such as optical amplifiers. Optical links 122 and 124 may be duplex links having the optical signals travel in both directions, where egress point 106 may be an egress/ingress point. Communication network 100 is a simple example to help describe the invention.

Figure 2:
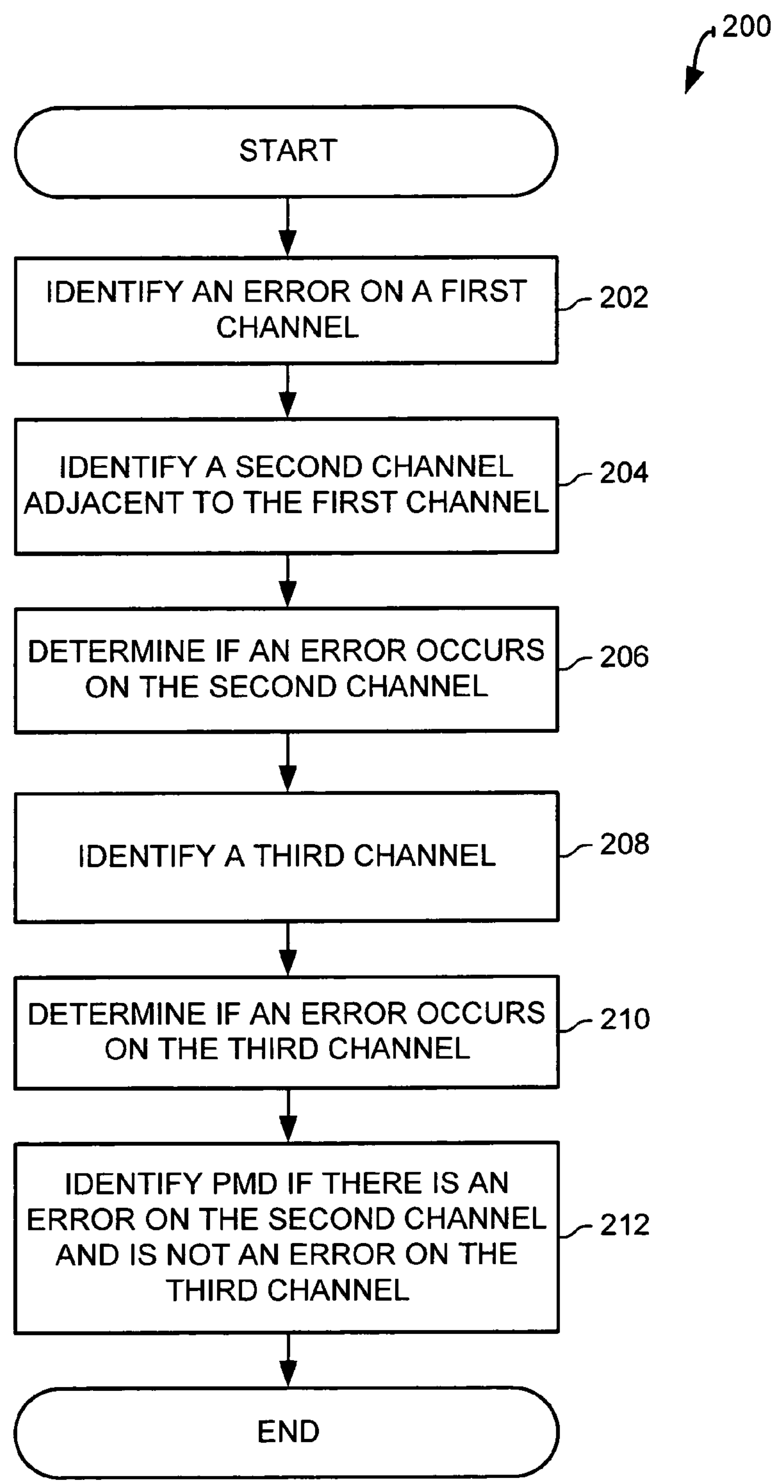
FIG. 2 is a flow chart illustrating a process for a monitoring system in an example of the invention.

FIG. 2 is a flow chart illustrating a process 200 for monitoring system 108 in an example of the invention. By performing process 200, monitoring system 108 is able to monitor communication network 100 for polarization-mode dispersion (PMD). Referring back to FIG. 1, database system 114 is configured to store identities for the plurality of channels $\lambda_1$, $\lambda_2$, $\lambda_3$, $\lambda_{3'}$, . . . , $\lambda_n$ in communication network 100. Database system 114 may be pre-programmed with the identities of the plurality of channels $\lambda_1$, $\lambda_2$, $\lambda_3$, $\lambda_{3'}$, . . . , $\lambda_n$, processing system 112 may program database system 114 with the identities of the plurality of channels $\lambda_1$, $\lambda_2$, $\lambda_3$, $\lambda_{3'}$, . . . , $\lambda_n$, etc. In step 202, processing system 112 identifies an error on a first channel $\lambda_2$ of the plurality of channels $\lambda_1$, $\lambda_2$, $\lambda_3$, $\lambda_{3'}$, . . . , $\lambda_n$. In step 204, processing system 112 identifies a second channel $\lambda_3$ of the plurality of channels $\lambda_1$, $\lambda_2$, $\lambda_3\lambda_{3'}$, . . . , $\lambda_n$ that is adjacent to the first channel $\lambda_2$ based on database system 114. In step 206, processing system 112 determines if an error occurs on the second channel $\lambda_3$ that is adjacent to the first channel $\lambda_2$. In step 208, processing system 112 identifies a third channel $\lambda_n$ of the plurality of channels $\lambda_1$, $\lambda_2$, $\lambda_3$, $\lambda_{3'}$, . . . , $\lambda_n$ based on database system 114. In step 210, processing system 112 determines if an error occurs on the third channel $\lambda_n$. In step 212, processing system 112 identifies polarization-mode dispersion based on determining the error occurs on the second channel $\lambda_3$ that is adjacent to the first channel $\lambda_2$ and determining the error does not occur on the third channel $\lambda_n$. Based on this disclosure, those skilled in the art would be able to modify existing monitoring systems to make monitoring system 108.

Because adjacent channels are correlated for polarization-mode dispersion events, monitoring system 108 advantageously identifies polarization-mode dispersion by looking at adjacent channels and potentially non-adjacent channels. Thus, polarization-mode dispersion may be identified without actually measuring the instantaneous polarization-mode dispersion or monitoring the analog characteristics of the optical signal for polarization-mode dispersion. As a result, the overall cost of identifying polarization-mode dispersion and operating and maintaining an optical network may be reduced.

Referring again to FIG. 1, the first channel $\lambda_2$ may not have the same adjacent channels all the way through communication network 100. For instance, the first channel $\lambda_2$ is adjacent to channels $\lambda_1$ and $\lambda_{3'}$ on optical link 122. The first channel $\lambda_2$ is adjacent to channels $\lambda_1$ and $\lambda_3$ on optical link 124. Monitoring system 108 may trace the first channel $\lambda_2$ through communication network 100 to identify an adjacent channel on each optical link 122 and 124 from egress point 106 to ingress point 102. For example, channels adjacent to the first channel $\lambda_2$ from egress point 106 to ingress point 102 may include channels $\lambda_3$ and $\lambda_{3'}$. These may be the channels having wavelengths longer than a wavelength of the first channel $\lambda_2$ in the wavelength spectrum. In another example, a channel adjacent to the first channel $\lambda_2$ from egress point 106 to ingress point 102 may include channel $\lambda_1$. This may be the channel having wavelengths shorter than a wavelength of the first channel $\lambda_2$.

After identifying channels $\lambda_1$, $\lambda_3$, and $\lambda_{3'}$ that are adjacent to the first channel $\lambda_2$ from egress point 106 to ingress point 102, processing system 112 determines if an error occurs on the channels $\lambda_1$, $\lambda_3$, and $\lambda_{3'}$ that are adjacent to the first channel $\lambda_2$. If an error occurs on one of the adjacent channels $\lambda_1$, $\lambda_3$, and $\lambda_{3'}$, then processing system 112 determines if an error occurs on the third channel $\lambda_n$. Processing system 112 determines if an error occurs on another channel on each optical link 122 and 124 from egress point 106 to ingress point 102. Processing system 112 then identifies polarization-mode dispersion based on determining that an error occurs on one of the channels $\lambda_1$, $\lambda_3$, and $\lambda_{3'}$ that is adjacent to the first channel $\lambda_2$ and determining that an error does not occur on the third channel $\lambda_n$.

In one embodiment, processing system 112 may prioritize examination of the channels as follows. Processing system 112 examines channel $\lambda_1$ first as channel $\lambda_1$ has the same optical path as channel $\lambda_2$. Processing system 112 examines channel $\lambda_3$ next assuming optical link 124 has a higher mean DGD than optical link 122. Processing system 112 examines channel $\lambda_{3'}$ third. If an error is found on any of these channels, then processing system 112 examines channel $\lambda_n$ because channel $\lambda_n$ shares the same optical path as channel $\lambda_2$. If no error is found on channel $\lambda_n$, then processing system 112 does not need to examine any other channels.

EXAMPLE #2

FIGS. 3–6

Figure 3:
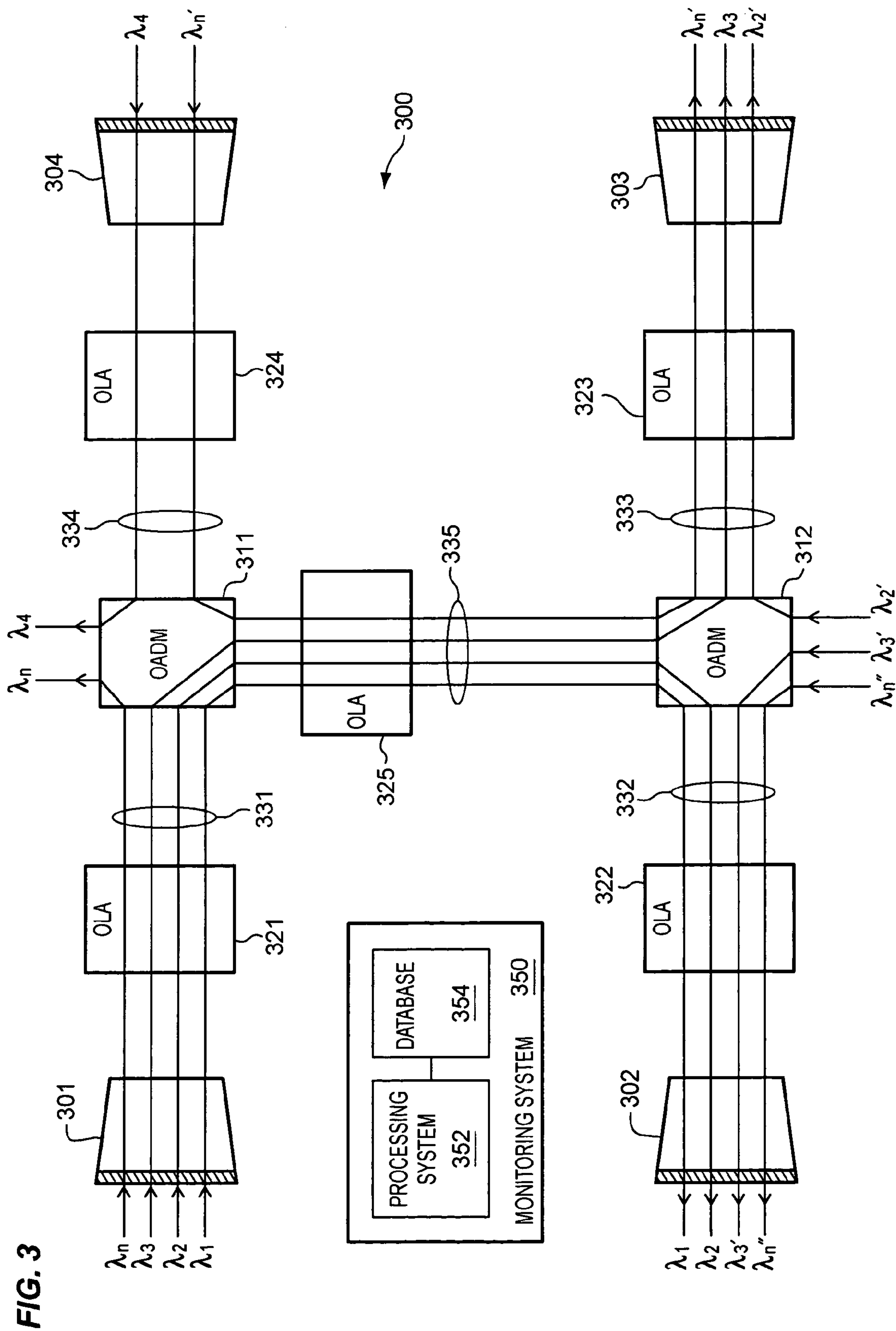
FIG. 3 illustrates a communication network in an example of the invention.

FIG. 3 illustrates a communication network 300 in an example of the invention. Communication network 300 is comprised of endpoints 301–304, multi-degree Optical Add/Drop Multiplexers (OADM) 311–312, Optical Line Amplifiers (OLA) 321–325, and a monitoring system 350. Monitoring system 350 is comprised of a processing system 352 and a database 354. Endpoints 301–304 and OADMs 311–312 may include dense wavelength division multiplexing (DWDM) multiplexers and demultiplexers (not shown).

Endpoint 301 is coupled to OADM 311 by an optical link 331. Endpoint 302 is coupled to OADM 312 by an optical link 332. Endpoint 303 is coupled to OADM 312 by an optical link 333. Endpoint 304 is coupled to OADM 311 by an optical link 334. OADM 311 is coupled to OADM 312 by an optical link 335. OLA 321 is coupled to optical link 331. OLA 322 is coupled to optical link 332. OLA 323 is coupled to optical link 333. OLA 324 is coupled to optical link 334. OLA 325 is coupled to optical link 335.

Endpoint 301 is an ingress point for channels $\lambda_1$, $\lambda_2$, $\lambda_3$, and $\lambda_n$. Channels $\lambda_1$, $\lambda_2$, $\lambda_3$, and $\lambda_n$ travel over optical link 331 to OADM 311. Endpoint 304 is an ingress point for channels $\lambda_{n'}$ and $\lambda_4$. Channels $\lambda_{n'}$ and $\lambda_4$ travel over optical link 334 to OADM 311. OADM 311 passes channels $\lambda_1$, $\lambda_2$, $\lambda_3$, and $\lambda_{n'}$ over optical link 335. OADM 311 drops channels $\lambda_n$ and $\lambda_4$. Channels $\lambda_1$, $\lambda_2$, $\lambda_3$, and $\lambda_{n'}$ travel over optical link 335 to OADM 312. OADM 312 passes channels $\lambda_1$ and $\lambda_2$ over optical link 332. OADM 312 also adds channels $\lambda_{3'}$ and $\lambda_{n''}$ to optical link 332. OADM 312 passes channels $\lambda_3$ and $\lambda_{n'}$ over optical link 333. OADM 312 also adds channel $\lambda_{2'}$ to optical link 333. Endpoint 302 is an egress point for channels $\lambda_1$, $\lambda_2$, $\lambda_{3'}$, and $\lambda_{n''}$. Endpoint 303 is an egress point for channels $\lambda_{2'}$, $\lambda_3$, and $\lambda_{n'}$. Each channel may have a bit rate of at least 2.5 Gb/s, such as 2.5 Gb/s, 10 Gb/s, or 40 Gb/s.

Database 354 stores information on the identity of each channel of communication network 300, the path each channel takes though communication network 300, and other information. For instance, database 354 stores information that channel $\lambda_2$ ingresses at endpoint 301, travels over optical links 331, 335, and 332, and egresses at endpoint 302. Database 354 also stores information that channel $\lambda_2$ is adjacent to channels $\lambda_1$ and $\lambda_3$ in optical links 331 and 335, and is adjacent to channels $\lambda_1$ and $\lambda_{3'}$ in optical link 332.

Endpoints 301–305 may be Optical-to-Electrical-to-Optical (OEO) endpoints. When the data on the channels is in digital form in endpoints 301–305, processing system 352 is able to monitor the data to look for errors. Processing system 352 may look for parity errors or other digital performance information.

If processing system 352 identifies an error on channel $\lambda_2$, for instance, then processing system 352 checks to see if the error may be caused by polarization-mode dispersion. To check for polarization-mode dispersion, processing system 352 identifies channels that are adjacent to channel $\lambda_2$. Processing system 352 identifies adjacent channels from endpoint 301 where channel $\lambda_2$ ingresses communication network 300 to endpoint 302 where channel $\lambda_2$ egresses communication network 300. Tracing channel $\lambda_2$ back through communication network 300, channels $\lambda_1$ and $\lambda_{3'}$ are adjacent to channel $\lambda_2$ in optical link 332. Channels $\lambda_1$ and $\lambda_3$ are adjacent to channel $\lambda_2$ in optical links 335 and 331.

Processing system 352 may be made more efficient by identifying the optical links that have the highest mean DGD and prioritizing the search to determine if errors are occurring on the adjacent channels within these links. In addition, processing system 352 may prioritize those channels that are in the largest number of optical links with the first channel. Those that have the minimum difference in frequency from the first channel may be prioritized.

After processing system 352 identifies the adjacent channels through communication network 300, processing system 352 checks for errors on the adjacent channels. To check for errors, processing system 352 locates the endpoint for the adjacent channels. Endpoint 302 is the endpoint for channels $\lambda_1$ and $\lambda_{3'}$. Processing system 352 processes digital data from endpoint 302 to check for errors on channels $\lambda_1$ and $\lambda_{3'}$. Processing system 352 may also process analog data to check for errors in some examples. Endpoint 303 is the endpoint for channel $\lambda_3$. Processing system 352 processes digital data from endpoint 303 to check for errors on channel $\lambda_3$. If no errors are detected, then processing system 352 determines that the error on channel $\lambda_2$ is probably not caused by polarization-mode dispersion.

Processing system 352 may prioritize examination of the channels as follows. Processing system 352 examines channel $\lambda_1$ first as channel $\lambda_1$ has the same optical path as channel $\lambda_2$. Processing system 352 examines channel $\lambda_3$ next assuming optical links 331 and 335 have higher mean DGD than optical link 332. Processing system 112 examines channel $\lambda_{3'}$ third.

If an error is detected on one or more of the adjacent channels, then processing system 352 identifies at least one other channel on each optical link 331, 335, and 332. Processing system 352 identifies channels from endpoint 301 where channel $\lambda_2$ ingresses communication network 300 to endpoint 302 where channel $\lambda_2$ egresses communication network 300. Tracing channel $\lambda_2$ back through communication network 300, channel $\lambda_{n''}$ is in optical link 332 with channel $\lambda_2$. Channel $\lambda_{n'}$ is in optical link 335 with channel $\lambda_2$. Channel $\lambda_n$ is in optical link 331 with channel $\lambda_2$. Processing system 352 may also identify other channels that are in optical links 331, 335, and 332.

After processing system 352 identifies at least one channel in each optical link 331, 335, and 332 through communication network 300, processing system 352 checks for errors on each of the identified channels. To check for errors, processing system 352 locates the endpoint for each of the channels. Endpoint 302 is the endpoint for channel $\lambda_{n''}$. Processing system 352 processes digital data from endpoint 302 to check for errors on channel $\lambda_{n''}$. Endpoint 303 is the endpoint for channel $\lambda_{n'}$. Processing system 352 processes digital data from endpoint 303 to check for errors on channel $\lambda_{n'}$. The endpoint for channel $\lambda_n$ is not shown. Processing system 352 processes digital data from the endpoint for channel $\lambda_n$ to check for errors on channel $\lambda_n$. If there is a channel in each optical link 331, 335, and 332 that has no errors, then processing system 352 determines that the error on channel $\lambda_2$ is probably caused by polarization-mode dispersion. If an error is detected on all channels of an optical link 331, 335, and 332, then processing system 352 determines that the error on channel $\lambda_2$ is probably not caused by polarization-mode dispersion and may be a fiber cut.

Figure 4:
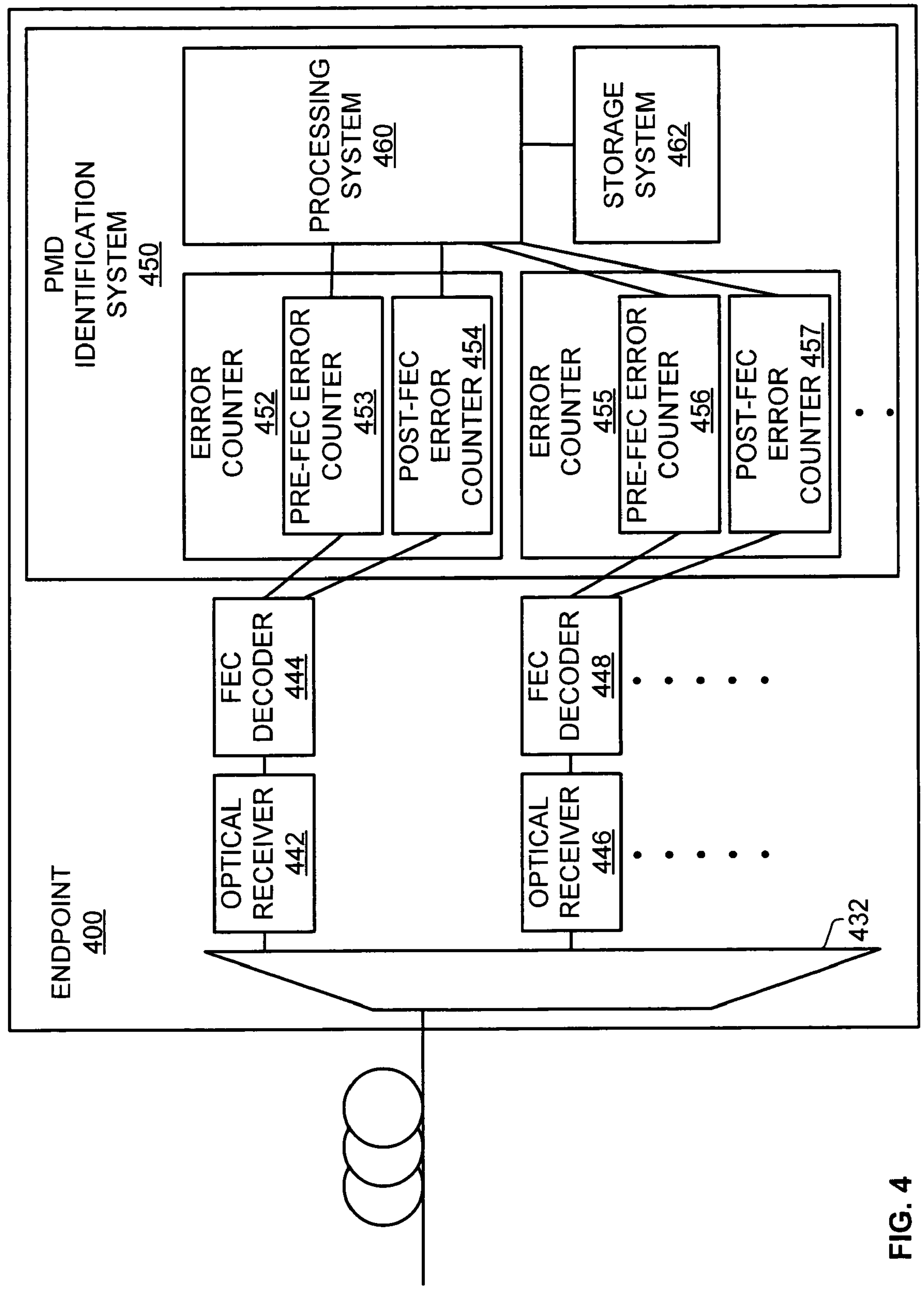
FIG. 4 illustrates an endpoint in an example of the invention.

FIG. 4 illustrates an endpoint 400 in an example of the invention. Endpoint 400 may illustrate the configuration of endpoints 301–304. Endpoint 400 comprises dense wavelength division multiplexing (DWDM) demultiplexer 432, an optical receiver 442, a forward error correction (FEC) decoder 444, an optical receiver 446, an FEC decoder 448, and a PMD identification system 450. PMD identification system 450 includes an error counter 452, an error counter 455, a processing system 460, and a storage system 462. Error counter 452 comprises a pre-FEC error counter 453 and a post-FEC error counter 454. Error counter 455 comprises a pre-FEC error counter 456 and a post-FEC error counter 457.

DWDM demultiplexer 432 is connected to optical receiver 442 and optical receiver 446. Optical receiver 442 is connected to FEC decoder 444. FEC decoder 444 is connected to pre-FEC error counter 453 and post-FEC error counter 454. Pre-FEC error counter 453 and post-FEC error counter 454 are connected to processing system 460. Optical receiver 446 is connected to FEC decoder 448. FEC decoder 448 is connected to pre-FEC error counter 456 and post-FEC error counter 457. Pre-FEC error counter 456 and post-FEC error counter 457 are connected to processing system 460.

DWDM demultiplexer 432 has outputs for multiple channels. Optical receiver 442, FEC decoder 444, and error counter 452 correlate to a first channel. Optical receiver 446, FEC decoder 448, and error counter 455 correlate to a second channel. The other outputs of the DWDM demultiplexer 432 and the corresponding optical receiver, FEC decoder, and error counter for the other remaining channels are not shown in FIG. 4 for the sake of simplicity.

Some of all of the circuitry or functionality of endpoint 400 may be included in monitoring system 350 in FIG. 3.

Figure 5:
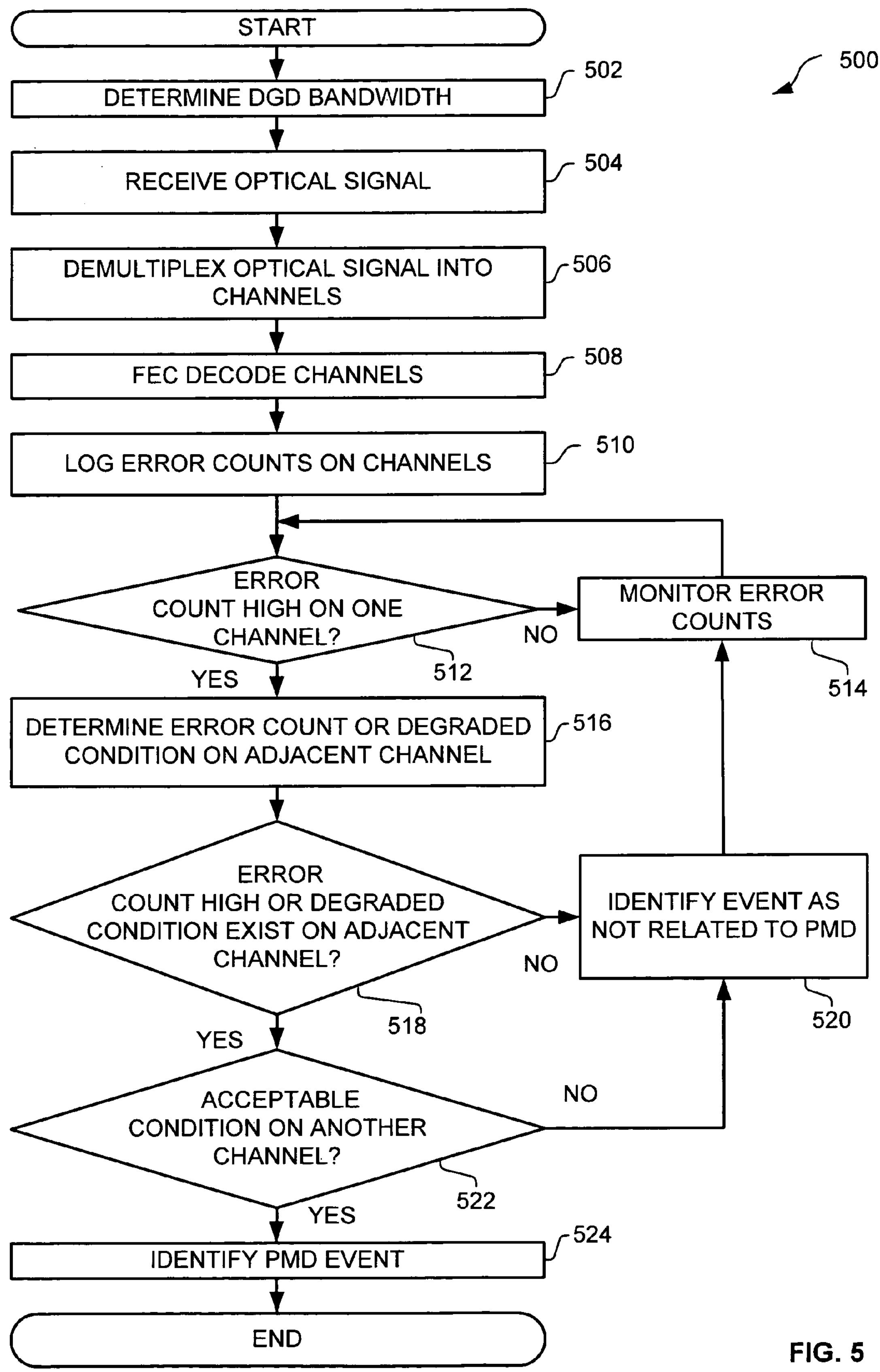
FIG. 5 is a flow chart illustrating a process for an endpoint in an example of the invention.

FIG. 5 is a flow chart illustrating a process for endpoint 400 in an example of the invention. Endpoint 400 receives an optical signal that is FEC encoded and dense wavelength division multiplexed. In step 502, processing system 460 determines a differential group delay (DGD) bandwidth. In step 504, DWDM demultiplexer 432 receives an optical signal comprising multiple channels. In step 506, DWDM demultiplexer 432 demultiplexes the optical signal into the multiple channels. Optical receiver 442 receives a first channel and converts the first channel from optical format to electrical format. One example of optical receiver 442 is a photo-detector.

In step 508, FEC decoder 444 FEC decodes the first channel in electrical format. In step 510, FEC decoder 444 logs the number of bit errors corrected with pre-FEC error counter 453. If FEC decoder 444 is unable to correct the first channel, then FEC decoder 444 logs an error in post-FEC counter 454. In this embodiment, FEC correction occurs prior to polarization-mode dispersion (PMD) identification. In some embodiments, PMD identification occurs with no FEC correction. In another embodiment, unusually high pre-FEC errors are proactively monitored on all channels to either predict or proactively protect the channels so there is no unscheduled event. In this proactive case, an unusually high pre-FEC error count identified in step 512 starts or triggers the investigation in step 516.

In step 512, processing system 460 determines whether an error count is high on the first channel. Processing system 460 may also determine whether the error count exceeds a threshold to determine if the error count is high. If the error count is not high, then processing system 460 monitors the error counts for the other channels in step 514 before returning to step 512. Processing system 460 waits for a triggering event in step 512 and step 514. If a triggering count is not present, then processing system 460 continues to assist in logging of errors and waits for a triggering event. Once processing system 460 determines a triggering event has occurred through a high error count or a degraded condition in step 512, processing system 460 determines the error counts or degraded conditions on an adjacent channel in step 516. In this embodiment, the error count for the adjacent channel is from pre-FEC error counter 456.

In step 518, processing system 460 checks whether the error count for any adjacent channel is high or a degraded condition exists for the adjacent channel. If the error count for any adjacent channel is not high and there is no degraded condition for any adjacent channel, then processing system 460 identifies the event as not related to PMD in step 520 and the process returns to step 514. If the error count for an adjacent channel is high or there is degraded condition in the adjacent channel, then processing system 460 determines if at least one other channel is operating with acceptable conditions in step 522. If at least one channel is operating with acceptable conditions, then processing system 460 identifies that the error condition on the first channel is occurring due to polarization-mode dispersion in step 524. This identification as a PMD-induced error condition is based on the occurrence of a high error count on the channel, the presence of a high error count or degraded condition on an adjacent channel, and acceptable conditions in at least one other channel.

In other embodiments, processing system 460 performs the operations of FEC decoder 444 and error counter 452. In some embodiments, processing system 460 generates and transmits an instruction indicating the presence of PMD to other management systems or systems that need to be alerted for PMD.

In another embodiment, processing system 460 uses a table as depicted in FIG. 6 to determine the likelihood of PMD events and may be used to enhance the confidence of the PMD event identification in step 524. FIG. 6 illustrates a table of polarization-mode dispersion statistics in an example of the invention. The table in FIG. 6 assists engineers and network planners in gauging the impact of PMD on link availability and is based on a study of a direct-buried fiber-optic cable and a calculated measure, M.

The data in FIG. 6 can be used to estimate PMD induced outage probability of channels and therefore, the expected number of channels that should be operating with acceptable conditions. Observation that the expected number of channels is operating with acceptable conditions would improve the confidence of the outage as a PMD induced outage.

In FIG. 6, the first column, M, is a ratio of an endpoint's DGD tolerance, $\Delta\tau_{RX}$, to the optical fiber's mean DGD. The second column, $P_{out}$, is an annualized outage probability in minutes/year. The third column, $R_{out}$, is a mean outage rate with a number of outage events/year. The fourth column, $T_{out}$, is a mean outage duration in minutes/event. Thus, optical fibers with a high mean DGD have a narrower DGD bandwidth than optical fibers with a low mean DGD. While PMD-induced events are localized in frequency (i.e., occurring at a narrow band of wavelengths), in a DWDM system where channel spacing is small, a PMD-induced outage may affect a handful of adjacent channels. In a DWDM application, if a PMD event arises on one channel as registered by the occurrence of bit errors, it is likely that adjacent channels are affected to some extent. No other fiber impairment or trouble resulting from a hardware failure is known to be so spectrally localized and be sustained for the time durations shown in FIG. 6. (While a laser's drifting wavelength could also cause spectrally localized problems, laser operating wavelengths are continuously monitored and when excessive drift is detected, the wayward lasers are automatically shut down.)

The following three examples show how the table in FIG. 6 is used. The first example is for a 10 Gb/s optical system with a mean DGD of 10 picoseconds (ps) and an endpoint DGD tolerance of 40 ps. The DGD margin, M, for this first example is 4.0. The outage probability is about $7.4\times10^{-9}$ or effectively zero based on the 0.0037 minutes/year from FIG. 6 for a DGD margin of 4. Thus, a PMD-induced event is unlikely to be occurring on non-adjacent channels. For this case, the DGD bandwidth will be about 90 GHz or about 0.72 nanometer (nm). When a PMD-induced event does occur, it is highly likely that higher than normal errors will be present on adjacent channels in a system with 50 GHz (0.4 nm) channel spacing, and highly likely that other channels will be operating under acceptable conditions.

The second example is for a 10 Gb/s optical system with a mean DGD of 10 ps and an endpoint DGD tolerance of 23 ps. The DGD margin, M, for this second example is 2.3. The outage probability of the DGD exceeding the receiver's limit is about 0.37%. Based on the buried optical fiber for the table in FIG. 6, PMD-induced events will typically occur about once a month with a mean duration of about three hours. The DGD bandwidth will be about 90 GHz and it is highly likely that higher than normal bit errors will be present on adjacent channels. In this example, if the system has many channels, a small number of non-adjacent channels may also be experiencing errors or a degraded condition. It is highly likely that most other channels will be operating with acceptable conditions.

The third example is for a 40 Gb/s optical system with a mean DGD of 3.2 ps and an endpoint DGD tolerance of 5.7 ps. The DGD margin, M, for this third example is 1.8. The outage probability of the DGD exceeding the receiver's limit is about 4.4%. The PMD-induced outage typically will occur about every six days with a mean duration of about 4 hours. However, outages persisting for a day may occur. The DGD bandwidth is about 2.2 nm or 280 GHz, so several adjacent channels with 50 GHz spacing will have high BERs. Also, for a DWDM application with 100 GHz channel spacing, adjacent channels would also be affected during each event. It is also likely that for any DWDM system that has a significant number of channels, a small number of other channels would be experiencing PMD induced outages.

Processing systems 352 and 460 in FIGS. 3 and 4 may be comprised of programmed general-purpose computers, although those skilled in the art will appreciate that programmable or special purpose circuitry and equipment may be used. Processing systems 352 and 460 may comprise computer microprocessors, logic circuits, or some other processing devices. Processing systems 352 and 460 may be distributed among multiple processing devices.

Storage system 462 in FIG. 4 may comprise a disk, tape, integrated circuit, server, or some other memory device. Storage system 462 may be distributed among multiple memory devices. Processing system 460 retrieves and executes operating software and application software from storage system 462. The operating software may comprise an operating system, utilities, drivers, networking software, and other software typically loaded onto a general-purpose computer. The application software may comprise an application program, firmware, or some other form of machine-readable processing instructions. When executed by processing system 460, application software directs processing system 460 to operate in accord with the invention as described above.

What is claimed is:

1. A method of monitoring a communication network to identify polarization-mode dispersion, the method comprising:

identifying an error on a first channel of a plurality of channels in the communication network;

identifying a second channel of the plurality of channels that is adjacent to the first channel;

determining if an error occurs on the second channel that is adjacent to the first channel;

identifying a third channel of the plurality of channels;

determining if an error occurs on the third channet; and identifying the polarization-mode dispersion based on determining the error occurs on the second channel that is adjacent to the first channel and determining the error does not occur on the third channel.

2. The method of claim 1 wherein identifying a second channel of the plurality of channels that is adjacent to the first channel comprises:

identifying the second channel that is adjacent to the first channel on each optical link from an egress point for the first channel to an ingress point for the first channel.

3. The method of claim 2 wherein identifying a third channel of the plurality of channels comprises:

identifying the third channel on each optical link from the egress point for the first channel to the ingress point for the first channel.

4. The method of claim 1 wherein:

identifying an error on a first channel comprises determining the error on the first channel at an egress point for the first channel;

determining if an error occurs on the second channel comprises determining if the error occurs on the second channel at an egress point for the second channel; and determining if an error occurs on the third channel comprises determining if the error occurs on the third channel at an egress point for the third channel.

5. The method of claim 4 wherein the egress points comprise optical-to-electrical systems.

6. The method of claim 1 wherein the second channel that is adjacent to the first channel comprises an adjacent channel having a wavelength shorter than a wavelength for the first channel.

7. The method of claim 1 wherein the second channel that is adjacent to the first channel comprises an adjacent channel having a wavelength longer than a wavelength for the first channel.

8. The method of claim 1 wherein identifying an error on a first channel comprises:

identifying a parity check error on the first channel.

9. The method of claim 1 wherein identifying an error on a first channel comprises:

identifying if an error count for the first channel exceeds a threshold.

10. The method of claim 1 wherein the plurality of channels have a bit rate of at least 2.5 Gigabits per second.

11. A monitoring system configured to monitor a communication network for polarization-mode dispersion, the monitoring system comprising:

a database system configured to store identities for a plurality of channels in the communication network; and a processing system configured to:

identify an error on a first channel of the plurality of channels;

identify a second channel of the plurality of channels that is adjacent to the first channel based on the database system, determine if an error occurs on the second channel that is adjacent to the first channel, identify a third channel of the plurality of channels based on the database system, determine if an error occurs on the third channel, and identify the polarization-mode dispersion based on determining the error occurs on the second channel that is adjacent to the first channel and determining the error does not occur on the third channel.

12. The monitoring system of claim 11 wherein the processing system is configured to:

identify the second channel that is adjacent to the first channel on each optical link from an egress point for the first channel to an ingress point for the first channel.

13. The monitoring system of claim 12 wherein the processing system is configured to:

identify the third channel on each optical link from the egress point for the first channel to the ingress point for the first channel.

14. The monitoring system of claim 11 wherein the processing system is configured to:

identify the error on the first channel at an egress point for the first channel, determine if the error occurs on the second channel at an egress point for the second channel, and determine if the error occurs on the third channel at an egress point for the third channel.

15. The monitoring system of claim 14 wherein the egress points comprise optical-to-electrical systems.

16. The monitoring system of claim 11 wherein the second channel comprises an adjacent channel having a wavelength shorter than a wavetength for the first channel.

17. The monitoring system of claim 11 wherein the third channel comprises an adjacent channel having a wavelength longer than a wavelength for the first channel.

18. The monitoring system of claim 11 wherein processing system is configured to:

identify a parity check error on the first channel.

19. The monitoring system of claim 11 wherein processing system is configured to:

identify if an error count for the first channel exceeds a threshold.

20. The monitoring system of claim 11 wherein the plurality of channels have a bit rate of at least 2.5 Gigabits per second.

* * * * *